US012427494B2

(12) United States Patent
Hu et al.

(10) Patent No.: US 12,427,494 B2
(45) Date of Patent: Sep. 30, 2025

(54) COATED LITHIUM-ION SIEVE AND PREPARATION METHOD THEREOF

(71) Applicant: LIS (SHANGHAI MATERIAL TECHNOLOGY CO., LTD., Shanghai (CN)

(72) Inventors: Yu Hu, Shanghai (CN); Jingze Zhang, Shanghai (CN); Luri Bao, Shanghai (CN); Weiping Tang, Shanghai (CN)

(73) Assignee: LIS (SHANGHAI) MATERIAL TECHNOLOGY CO., LTD., Shanghai (CN)

( * ) Notice: Subject to any disclaimer, the term of this patent is extended or adjusted under 35 U.S.C. 154(b) by 142 days.

(21) Appl. No.: 17/777,012

(22) PCT Filed: Oct. 9, 2021

(86) PCT No.: PCT/CN2021/122753

§ 371 (c)(1),
(2) Date: Jun. 30, 2022

(87) PCT Pub. No.: WO2022/134736

PCT Pub. Date: Jun. 30, 2022

(65) Prior Publication Data

US 2024/0165579 A1 May 23, 2024

(30) Foreign Application Priority Data

Dec. 23, 2020 (CN) ......................... 202011537107.1

(51) Int. Cl.

*B01J 20/04* (2006.01)
*B01J 20/06* (2006.01)
*B01J 20/28* (2006.01)
*B01J 20/30* (2006.01)
*B01J 20/32* (2006.01)

(52) U.S. Cl.

CPC ............. *B01J 20/041* (2013.01); *B01J 20/06* (2013.01); *B01J 20/28007* (2013.01); *B01J 20/28016* (2013.01); *B01J 20/3078* (2013.01); *B01J 20/3204* (2013.01); *B01J 20/3236* (2013.01); *B01J 20/3293* (2013.01)

(58) Field of Classification Search

CPC .... B01J 20/041; B01J 20/06; B01J 20/28007; B01J 20/28016; B01J 20/3075; B01J 20/3204; B01J 20/3236; B01J 20/3293
USPC .................. 502/324, 524; 429/224; 428/403; 977/773, 811
See application file for complete search history.

(56) References Cited

U.S. PATENT DOCUMENTS 11,253,848 B2 * 2/2022 Snydacker ................ C02F 1/42
11,794,182 B2 * 10/2023 Snydacker ............. B01J 47/018
2010/0216032 A1 * 8/2010 Baba ................. H01M 10/0562 29/623.3
2015/0147651 A1 * 5/2015 Hong .................. H01M 4/0471 427/126.3
2024/0165579 A1 5/2024 Hu et al.

FOREIGN PATENT DOCUMENTS

CL 52922 5/2012
CL 202002115 A1 1/2021
CL 202101426 A1 11/2021
CN 107376827 A * 11/2017 .......... B01J 20/0211
CN 201710810124.X A1 11/2017
CN 109999750 A 7/2019
CN 112791691 A 5/2021
JP 2001366177 A1 6/2003
(Continued)

OTHER PUBLICATIONS

Xichang Shi et al., "Synthesis and properties of Li1.6Mn1.6O4 and its adsorption application." Hydrometallurgy 110, pp. 99-106. (Year: 2011).*
Pammin Yang et al., "Accelerating adsorption capacity and structural stability of Li1.6Mn1.6O4-type adsorbents via synergetic effect of in-situ configured Li2MnO3 layer." Chemical Engineering Journal 495, pp. 1-10. (Year: 2024).*
International Search Report and Written Opinion of the International Searching Authority dated Jan. 7, 2022 for PCT Patent application No. PCT/CN2021/122753.
Second Office Action dated Jun. 3, 2024 for Chile patent application No. 202201543.
First Office Action dated Jun. 3, 2025 for JP Patent application No. 2022-531507.

*Primary Examiner* — Patricia L. Hailey
(74) *Attorney, Agent, or Firm* — Maschoff Brennan

(57) ABSTRACT

The present invention disclosures a preparation method for a coated lithium ion sieve, the method comprises: S01: calcining manganese salt in an air atmosphere for 2 h~10 h to form $Mn_2O_3$; S02: mixing $Mn_2O_3$ with lithium salt and grinding, reacting in a high-pressure reaction kettle at 100° C.~200° C. for 36 h~72 h to form a product of $LiMnO_2$; wherein, the molar ratio of $Mn_2O_3$ and Li/Mn in the lithium salt is 1:1~10:1; S03: adding $LiMnO_2$ to a metal coating reagent and ultrasonic mixing for 2 h~10 h, drying for 6 h~24 h, and then calcining at 400° C.~600° C. for 2 h~10 h to form an oxide-coated $Li_{1.6}Mn_{1.6}O_4$ lithium ion adsorbent; Wherein, the molar ratio of the metal coating reagent to $LiMnO_2$ is 0.01:1~0.08:1; S04: performing an acid treatment to the oxide-coated $Li_{1.6}Mn_{1.6}O_4$ lithium-ion adsorbent to form an acidified product, washing the acidified product and drying to form the coated lithium-ion sieve. The cell structure of the coated lithium-ion sieve of the present invention is more stabler and can be reused for many cycles, which solves a problem that traditional $HMn_2O_4$ lithium-ion sieve is easy to dissolve.

8 Claims, 2 Drawing Sheets

(56) References Cited

FOREIGN PATENT DOCUMENTS

| | | | | | |
|---|---|---|---|---|---|
| JP | 2003168431 | A | * | 6/2003 | ............. C01G 45/00 |
| JP | 2019535503 | A | | 12/2019 | |
| WO | 2011058841 | A1 | | 5/2011 | |
| WO | 2018089932 | A1 | | 5/2018 | |
| WO | 2019203274 | A1 | | 10/2019 | |
| WO | 2020115948 | A1 | | 6/2020 | |

* cited by examiner

COATED LITHIUM-ION SIEVE AND PREPARATION METHOD THEREOF

CROSS-REFERENCE TO RELATED APPLICATION

This application claims priority of International Patent Application Serial No. PCT/CN2021/122753, filed Oct. 9, 2021, which is related to and claims priority of Chinese Patent Application Serial No. CN202011537107.1, filed Dec. 23, 2020. The entirety of each of the above-mentioned patent applications is hereby incorporated herein by reference and made a part of this specification.

TECHNICAL FIELD

The disclosure relates to the technical field of lithium-ion sieves, in particular to a coated lithium-ion sieve and a preparation method thereof.

BACKGROUND

Wide application of power and energy storage lithium batteries in technical field of new energy has promoted continuous increase in global demand for lithium resources. It is widely used in emerging fields such as lubricants, ceramics, pharmaceuticals, batteries, and atomic energy, which has become an important strategic resource for national economy and national defense construction.

At present, spinel-type lithium manganese oxide (LMO) has caused considerable research hotspots due to its higher adsorption capacity and $Li^+$ selectivity, including $LiMn_2O_4$, $Li_{1.33}Mn_{1.67}O_4$ and $Li_{1.6}Mn_{1.6}O_4$. Among all LMO spinel materials, $Li_{1.6}Mn_{1.6}O_4$ is the most representative because of its higher theoretical adsorption capacity and good stability after several cycles. However, dissolution of manganese not only reduces adsorption capacity, but also pollutes a desorption solution in practice, which limits its industrial application. Doping modification is considered to be the simplest and most effective method to improve manganese soluble loss of a spinel adsorbent. A main purpose of introducing doped ions is to increase average chemical valence of manganese in lithium manganese oxide spinel and reduce content of $Mn^{3+}$, so as to inhibit occurrence of a Jahn-Teller effect or enhance octahedral chemical bond. Chitrakar et al. studied an influence of $Li_mMg_xMn(III)_yMn(IV)_zO_4$ ($0 \le x \ge 0.5$) on dissolution of manganese during an acid treatment. Results show that with increasing of Mg/Mn ratio, adsorption capacity of lithium is increased, and chemical stability of adsorbent is also improved. $Fe_3O_4$ doped lithium manganese oxide ($LiMn_2O_4/Fe_3O_4$) is first synthesized as a magnetic ion sieve precursor by Xue et al., and $Fe_3O_4$ is doped into LMO to increase average valence of Mn in the magnetic ion sieve precursor from +3.48 to +3.53, which is capable of improving its structural stability. Ma et al. prepared a series of $LiM_xMn_{2-x}O_4$ (M=Ni, Al, Ti; $0 \le x \ge 1$) spinel adsorbents and compared lithium-ion recovery performances thereof in aqueous solutions. Results show that $LiAl_{0.5}Mn_{1.5}O_4$ exhibits higher $Li^+$ adsorption rate and lower Mn and Al soluble loss rate during an acid treatment, while $Li^+$ adsorption performance of $LiNi_{0.5}Mn_{1.5}O_4$ spinel and $LiTi_{0.5}Mn_{1.5}O_4$ spinel is relatively poor. Qian et al. improved Mn soluble loss rate in an acid treatment by doping $Li_{1.6}Mn_{1.6}O_4$ with different transition metal ions ($Fe^{3+}$, $Co^{2+}$). The adsorption results show that compared with an undoped adsorbent (32.3 mg/g), adsorption capacity of doped $Fe^{3+}$ and $Co^{2+}$ are 35.3 mg/g and 35.4 mg/g respectively, and the Mn soluble loss rate is reduced from 5.43% to 3.95% and 4.42%. During an ion doping process, doping metal ions occupying 8a position should be avoid so as not to hinder the movement of lithium ions.

SUMMARY

The purpose of the present invention is to provide a coated lithium-ion sieve and a preparation method thereof, which have advantages of higher adsorption capacity, less manganese soluble loss and higher cycle stability.

In order to achieve the above objective, the present invention adopts following technical solution: a coated lithium-ion sieve, comprising an inner shell and a coating layer, the coating layer uniformly covers the outside of the inner shell, the inner shell is $Li_{1.6}Mn_{1.6}O_4$, and the material of the coating layer is one of $Li_2O$, $Li_2MnO_3$, and $MnO_2$.

Further, the diameter of the coated lithium-ion sieve is 45 nm~55 nm; the thickness of the coating layer is 2 nm~4 nm.

A preparation method for the coated lithium ion sieve according to claim 1, comprising: S01: calcining manganese salt in air atmosphere for 2 h~10 h to form $Mn_2O_3$; S02: mixing $Mn_2O_3$ with lithium salt and grinding, reacting in a high-pressure reaction kettle at 100° C.~200° C. for 36 h~72 h to form a product of $LiMnO_2$; wherein, the molar ratio of Li/Mn in the mixture of $Mn_2O_3$ and the lithium salt is 1:1~10:1; S03: adding $LiMnO_2$ to a metal coating reagent and ultrasonic mixing for 2 h~10 h, drying for 6 h~24 h, and then calcining at 400° C.~600° C. for 2 h~10 h to form an oxide-coated $Li_{1.6}Mn_{1.6}O_4$ lithium ion adsorbent; Wherein, the molar ratio of the metal coating reagent to $LiMnO_2$ is 0.01:1~0.08:1; S04: performing an acid treatment to the oxide-coated $Li_{1.6}Mn_{1.6}O_4$ lithium-ion adsorbent to form an acidified product, washing the acidified product and drying to form the coated lithium-ion sieve.

Further, the manganese salt is manganese carbonate; and the metal coating reagent is manganese nitrate or lithium nitrate.

Further, the lithium salt is lithium hydroxide or lithium carbonate.

Further, the acid treatment is an immersion treatment with hydrochloric acid or sulfuric acid, the concentration of the hydrochloric acid or sulfuric acid is 0.25 mol/L~0.5 mol/L, and the immersion time is 12 h~48 h.

Further, in step S03, forming a solution by ultrasonic mixing and calcining in a muffle furnace at 400° C.~600° C. at a heating rate of 5° C./min~10° C./min.

Further, in step S02, the reaction temperature in the high-pressure reaction kettle is 110° C.~150° C.

Further, in step S03, the calcination temperature is 350° C.~450° C.

The beneficial effects of the present invention are:

1. The cell structure of the coated lithium-ion sieve of the present invention is more stable can be reused for many cycles, which solves a problem that traditional $HMn_2O_4$ lithium-ion sieve is easy to dissolve.

2. The coated lithium-ion sieve of the present invention has excellent morphology, average particle size is small and specific surface area is large, thus the coated lithium-ion sieve is used as a lithium-ion adsorbent, its specific morphology is conducive to contact with the lithium-containing liquid fully, so as to make insertion and extraction of lithium ions easily and ensure cycle stability of the coated lithium-ion sieve.

3. The preparation method of the present invention is simple, preparation conditions are mild, product consistency and stability are good, which is easy to realize industrialization.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
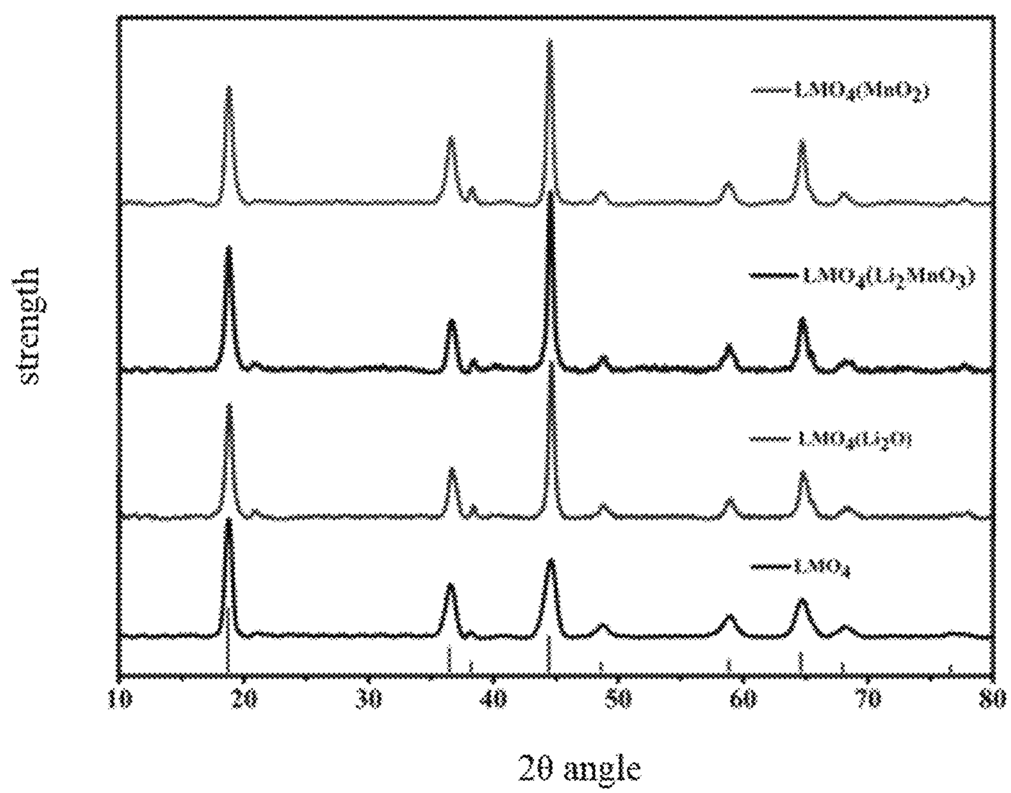
FIG. 1 is an XRD diagram of a coated lithium-ion sieve prepared in embodiment 1 of the present invention.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

In order to make the objectives, technical solutions and advantages of the present invention clearer, the specific embodiments of the present invention will be further described in detail below in conjunction with the accompanying drawings.

The invention discloses a coated lithium-ion sieve, comprising an inner shell and a coating layer, the coating layer uniformly covers the outside of the inner shell, the inner shell is $Li_{1.6}Mn_{1.6}O_4$, and the coating layer is any one of $Li_2O$, $Li_2MnO_3$, wherein, the diameter of the coated lithium-ion sieve is 45 nm~55 nm; the thickness of the coating layer is 2 nm~4 nm.

Preferably, the crystal form of the coated lithium-ion sieve in the present invention is a spinel structure, the lithium-ion sieve is a polyhedral particle, and average particle diameter is about 50 nm, the coating layer is about 3 nm, and the crystallinity of the polyhedral particle is good. The Mn soluble loss rate of the coated lithium-ion sieve of the present invention is significantly reduced, and the spinel structure is still kept after multiple adsorption cycles, which indicates that an adsorbent has a more stable crystal structure. It is beneficial to solve problems of high Mn soluble loss rate and instability of manganese-based adsorbents in practical applications. In addition, the coated lithium-ion sieve of the present invention has a small average particle size, and the lithium-ion sieve does not directly contact with a solution, which is beneficial to ensure the cycle stability of the lithium-ion sieve.

Embodiment 1

A preparation method for a coated lithium-ion sieve comprises following steps:

S01: calcining $MnCO_3$ in air atmosphere for 5 h to form $Mn_2O_3$.

S02: mixing $Mn_2O_3$ with lithium salt and grinding, transferring to a 100 mL stainless steel reaction kettle with a polytetrafluoroethylene lining, putting the reaction kettle into an oven, and performing a hydrothermal reaction at 120° C. for 48 hours to form a product; after reacting, putting the product in an oven and drying at 60° C. for 12 hours to form a product of $LiMnO_2$; wherein the molar ratio of Li/Mn in the mixture of $Mn_2O_3$ and the lithium salt is 1:1.

It is worth noting that actual amount of the lithium salt used is 1.00-1.05 times its theoretical amount. It is because a required precursor product can be formed after calcination at one time, and the loss of the lithium salt is small, so the actual amount of the lithium salt can be theoretical or slightly excessive. If the actual amount of the lithium salt is too much, residual lithium salt will affect product performances. In the present invention, while setting the molar ratio of Li/Mn in the mixture of $Mn_2O_3$ and the lithium salt, the theoretical amount and the actual amount of the lithium salt has been fully thought out.

S03: adding 1 g $LiMnO_2$ to a 4M lithium nitrate solution and ultrasonic mixing for 4 h, drying at 60° C. for 20 h to form dried powder, grinding the dried powder for fully mixing and then putting into a crucible, putting the crucible in a muffle furnace, heating up to 450° C. in air atmosphere at a heating rate of 5° C./min, performing a solid state reaction for 4h to form an oxide-coated $Li_{1.6}Mn_{1.6}O_4$ lithium ion adsorbent; wherein, the 4M lithium nitrate solution is a metal coating reagent, the molar ratio of the metal coating reagent to $LiMnO_2$ is 0.04:1; if coating amount is too low, a purpose of modification cannot be achieved; if the coating amount is too high, it will hinder extraction of lithium ions, which will reduce the adsorption capacity of the lithium-ion sieve.

Taking into account that lithium reacts with manganese to form $Li_2MnO_3$ which is stable to acidic environment during a reaction process, so lithium and manganese are used as coating elements of the present invention, which is convenient to improve overall stability of the lithium-ion sieve, thus crystalline structure after calcination is more stable. The lithium-ion sieve is not easy to dissolve during an adsorption process and a desorption process, which improves the service life of the lithium-ion sieve.

The anion of the metal coating reagent is preferably nitrate, because nitrate is easy to form corresponding oxides and nitrogen dioxide gas under heating conditions, and other elements are not brought into it.

S04: putting the oxide-coated $Li_{1.6}Mn_{1.6}O_4$ lithium-ion adsorbent into 20 mL dilute hydrochloric acid with a concentration of 0.5 mol/L, shaking for 24 h at room temperature for extracting Li completely to form a product. after filtering and washing, the product is putted in an oven at 60° C. for 12 hours to form a powder material, which is the coated lithium ion sieve in this embodiment. Wherein, if acidification soaking time is too short, lithium ion leached is insufficient, thus leaching time is too long, which leads to excessive acidification and Mn ions to be dissolved.

FIG. 1 is an XRD diagram of a coated lithium-ion sieve prepared in embodiment 1 of the present invention.

Combined with the XRD diagram, it can be seen that the phase composition of the precursor product is not changed by surface coating, $Li_{1.6}Mn_{1.6}O_4$ formed is in a good crystal form and pure phase. When $MnO_2$ is coated, the XRD diagram shows a characteristic diffraction peak of $Li_{1.6}Mn_{1.6}O_4$; when $Li_2O$ and $Li_2MnO_3$ are coated, a characteristic diffraction peak of $Li_2MnO_3$ appears.

Figure 2:
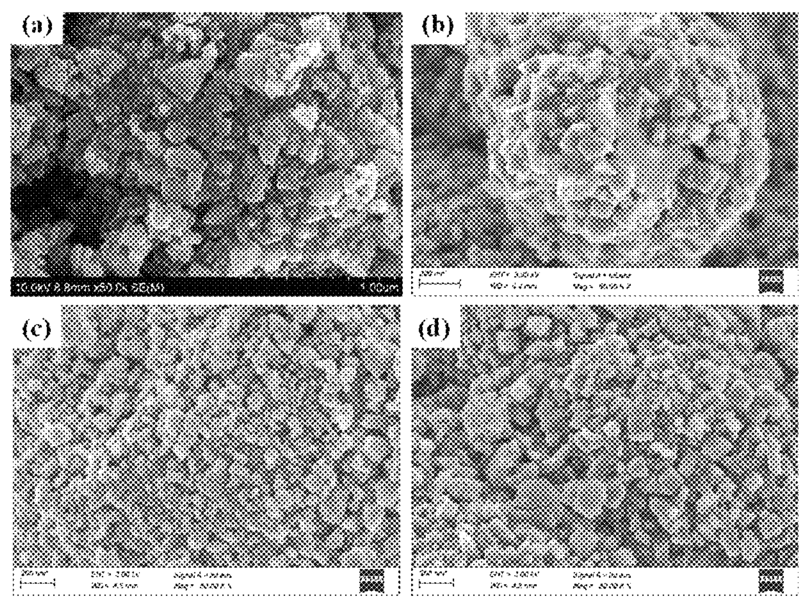
FIG. 2 is an SEM diagram of a coated lithium-ion sieve prepared in embodiment 1 of the present invention.
Figure 3:
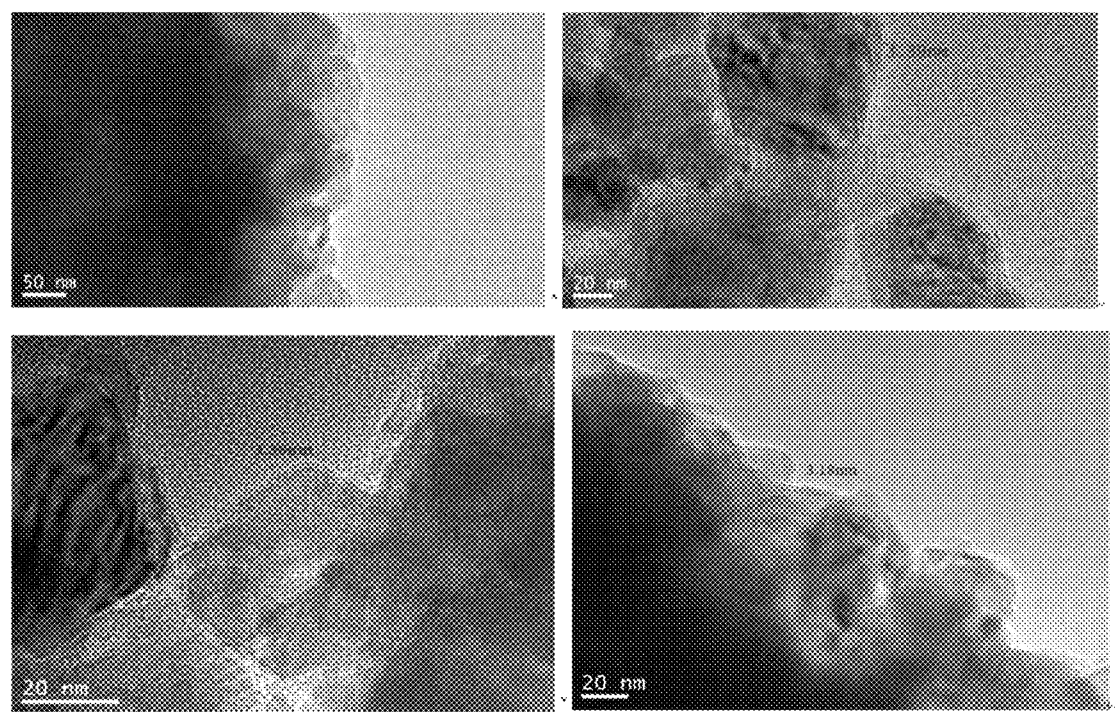
FIG. 3 is a TEM diagram of a coated lithium-ion sieve prepared in embodiment 1 of the present invention.

FIG. 2 is an SEM diagram of a coated lithium-ion sieve prepared in embodiment 1 of the present invention; FIG. 3 is a TEM diagram of a coated lithium-ion sieve prepared in embodiment 1 of the present invention. The SEM diagram shows that particle size is about 100 nm. Small polyhedral particles agglomerate into spherical secondary particles. From FIG. 2, it can be seen that uncoated precursor particles are larger and particle surface is relatively smooth, while precursor particles coated with metal oxides are uneven and smaller. In order to detect the coating thickness of the metal oxide on surface of a precursor $Li_{1.6}Mn_{1.6}O_4$, the surface of the coated precursor was analyzed by HRTEM (high resolution transmission electron microscope). From FIG. 3, It can be seen that a rough coating layer with a thickness of about 3 nm is coated on the surface of the precursor $Li_{1.6}Mn_{1.6}O_4$, which also proves that the metal oxide layer is coated by the precursor $Li_{1.6}Mn_{1.6}O_4$ successfully.

Embodiment 2

A preparation method for a coated lithium-ion sieve comprises following steps:

S01: calcining $MnCO_3$ in air atmosphere for 2 h to form $Mn_2O_3$.

S02: mixing $Mn_2O_3$ with lithium salt and grinding, transferring to a 100 mL stainless steel reaction kettle with a polytetrafluoroethylene lining, putting the reaction kettle into an oven, and performing a hydrothermal reaction at 120° C. for 36 hours; after reacting, putting a formed product in an oven and drying at 60° C. for 12 hours to form a product of $LiMnO_2$; wherein the molar ratio of Li/Mn in the mixture of $Mn_2O_3$ and lithium salt is 10:1.

S03: adding 1 g $LiMnO_2$ to a 4M lithium nitrate solution and ultrasonic mixing for 4 h, drying at 60° C. for 36 h to form dried powder, grinding the dried powder for fully mixing and then putting into a crucible, putting the crucible in a muffle furnace, heating up to 400° C. in air atmosphere at a heating rate of 7° C./min, performing a solid state reaction for 2 h to form an oxide-coated $Li_{1.6}Mn_{1.6}O_4$ lithium ion adsorbent; wherein, the 4M lithium nitrate solution is a metal coating reagent, the molar ratio of the metal coating reagent to $LiMnO_2$ is 0.01:1;

S04: putting the oxide-coated $Li_{1.6}Mn_{1.6}O_4$ lithium-ion adsorbent into dilute hydrochloric acid with a concentration of 0.4 mol/L, shaking for 24 h at room temperature for complete lithium extraction to form a product. After filtering and washing, the product is putted in an oven at 60° C. for 12 hours to form a powder material, which is the coated lithium ion sieve in this embodiment.

Embodiment 3

A preparation method for a coated lithium-ion sieve comprises following steps:

S01: calcining $MnCO_3$ in air atmosphere for 10 h to form $Mn_2O_3$;

S02: mixing $Mn_2O_3$ with lithium salt and grinding, transferring to a 100 mL stainless steel reaction kettle with a polytetrafluoroethylene lining, putting the reaction kettle into an oven, and performing a hydrothermal reaction at 200° C. for 72 hours; after reacting, putting a formed product in an oven and drying at 60° C. for 12 hours to form a product of $LiMnO_2$; wherein the molar ratio of Li/Mn in the mixture of $Mn_2O_3$ and lithium salt is 5:1;

S03: adding 1 g $LiMnO_2$ to a 4M lithium nitrate solution and ultrasonic mixing for 10 h, drying at 60° C. for 36h to form dried powder, grinding the dried powder for fully mixing and then putting into a crucible, putting the crucible in a muffle furnace, heating up to 600° C. in air atmosphere at a heating rate of 10° C./min, performing a solid state reaction for 10h to form an oxide-coated $Li_{1.6}Mn_{1.6}O_4$ lithium ion adsorbent; wherein, the 4M lithium nitrate solution is a metal coating reagent, the molar ratio of the metal coating reagent to $LiMnO_2$ is 0.08:1;

S04: putting the oxide-coated $Li_{1.6}Mn_{1.6}O_4$ lithium-ion adsorbent into dilute hydrochloric acid with a concentration of 0.4 mol/L, shaking for 24 h at room temperature for complete extraction of lithium to form a product. after filtering and washing, the product is putted in an oven at 60° C. for 12 hours to form a powder material, which is the coated lithium ion sieve in this embodiment.

Comparative Embodiment 1

Difference between comparative embodiment 1 and embodiment 1 is only that in S03, 1 g of $LiMnO_2$ is added to deionized water and ultrasonic mixing for 4 h.

Experimental Embodiment 1

20 mL of brine with an initial lithium-ion concentration of 165 mg/L and a solution pH of 12.0, adding 0.1 g of the coated lithium-ion sieves in embodiments 1-3 and comparative embodiment 1 respectively. under a conditions of 25° C. and a reaction time of 24 hours, adsorption capacities are measured for first adsorption capacity as shown in Table 1; the lithium-ion sieves adsorbed lithium ions can be reused after inorganic acid pickling, in this experimental embodiment, the lithium-ion sieves after inorganic acid pickling are measured for fifth adsorption capacity and tenth adsorption capacity by test methods which are the same as that of the first adsorption capacity.

TABLE 1

The adsorption capacities of lithium-ion sieves in different embodiments and a comparative embodiment

| | first adsorption capacity (mg/g) | fifth adsorption capacity (mg/g) | tenth adsorption capacity (mg/g) |
|---|---|---|---|
| Embodiment 1 | 42 | 21 | 16 |
| Embodiment 2 | 46 | 22 | 18 |
| Embodiment 3 | 44 | 19 | 17 |
| comparative embodiment 1 | 37 | 17 | 15 |

It can be seen that:

(1) Compared with the uncoated lithium-ion sieve in comparative embodiment 1, the adsorption capacity of the coated lithium-ion sieves prepared by the present invention for lithium ions are greatly increased; it shows that the coated lithium-ion sieves prepared by the present invention have high adsorption capacity and high selectivity to lithium ions.

(2) The coated lithium-ion sieves prepared by the method of the present invention is acid pickled after used. The adsorption capacity of the coated lithium-ion sieve after acid pickling are kept at more than 45% after 9 cycles, which means the coated lithium-ion sieve is stable and can be recycled for a long time.

Experimental Embodiment 2

A following method is used to test the manganese soluble loss of the lithium ion sieve in embodiments 1 to 3 and comparative embodiment: weighing 0.1 g of Mg-doped modified lithium ion sieve in embodiment 1 to 3 and comparative embodiment 1, putting into 20 ml containing $Li^+$ 165 mg/L salt lake brine for adsorbing at 25° C. for 48h, and pickling the lithium ion sieve, and then taking supernatant to measure a concentration of residual $Mn^{2+}$ by atomic absorption spectrometer or ICP; test results are shown in Table 2.

TABLE 2

Manganese soluble loss of lithium-ion sieves in different embodiments and a comparative embodiment

| | manganese soluble loss (%) |
|---|---|
| Embodiment 1 | 1.3 |
| Embodiment 2 | 1.45 |
| Embodiment 3 | 1.8 |
| comparative embodiment 1 | 2.5 |

It can be seen that the manganese soluble loss of the Mg-doped modified lithium-ion sieve prepared by the present invention is significantly lower than the manganese soluble loss of the pure lithium-ion sieve in comparative embodiment 1.

The cell structure of the coated lithium ion sieve of the present invention is more stable and can be reused for many cycles, which solves a problem that traditional $HMn_2O_4$ lithium ion sieve is easy to dissolve; the coated lithium ion sieve of the present invention has excellent morphology, average particle size is small and specific surface area is large, thus the coated lithium ion sieve is used as a lithium ion adsorbent, its specific morphology is conducive to contact with the lithium-containing liquid fully, so as to make insertion and extraction of lithium ions easily, and ensure cycle stability of the coated lithium ion sieve; The preparation method of the present invention is simple, preparation conditions are mild, product consistency and stability are good, which is easy to realize industrialization.

Other embodiments of the disclosure will be apparent to those skilled in the art from consideration of the specification and practice of the disclosure here. This application is intended to cover any variations, uses, or adaptations of the disclosure following the general principles thereof and including such departures from the disclosure as come within known or customary practice in the art. It is intended that the specification and embodiments be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A preparation method for a coated lithium-ion sieve, comprising:

S01: calcining manganese salt in air atmosphere for 2 h~10 h to form $Mn_2O_3$;

S02: mixing $Mn_2O_3$ with lithium salt and grinding, reacting in a high-pressure reaction kettle at 100° C.~200° C. for 36 h~72 h to form a product of $LiMnO_2$; wherein, the molar ratio of Li/Mn in the mixture of $Mn_2O_3$ and the lithium salt is 1:1~10:1;

S03: adding $LiMnO_2$ to a metal coating reagent and ultrasonic mixing for 2 h~10 h, drying for 6 h~24 h, and then calcining at 400° C.~600° C. for 2 h~10 h to form an oxide-coated $Li_{1.6}Mn_{1.6}O_4$ lithium ion adsorbent; wherein, the molar ratio of the metal coating reagent to $LiMnO_2$ is 0.01:1~0.08:1; and S04: performing an acid treatment to the oxide-coated $Li_{1.6}Mn_{1.6}O_4$ lithium-ion adsorbent to form an acidified product, washing the acidified product and drying to form the coated lithium-ion sieve, wherein the coated lithium-ion sieve comprises an inner shell and a coating layer, the coating layer uniformly covers the outside of the inner shell, the inner shell is $Li_{1.6}Mn_{1.6}O_4$, and the material of the coating layer is one of $Li_2O$, $Li_2MnO_3$, and $MnO_2$.

2. The preparation method of claim 1, wherein the manganese salt is manganese carbonate; and the metal coating reagent is manganese nitrate or lithium nitrate.

3. The preparation method of claim 1, wherein the lithium salt is lithium hydroxide or lithium carbonate.

4. The preparation method of claim 1, wherein the acid treatment is an immersion treatment with hydrochloric acid or sulfuric acid, the concentration of the hydrochloric acid or sulfuric acid is 0.25 mol/L~0.5 mol/L, and the immersion time is 12 h~48 h.

5. The preparation method of claim 1, wherein in step S03, forming a solution by ultrasonic mixing and calcining is performed in a muffle furnace at 400° C.~600° C. at a heating rate of 5° C./min~10° C./min.

6. The preparation method of claim 1, wherein in step S02, the reaction temperature in the high-pressure reaction kettle is 110° C.~150° C.

7. The preparation method of claim 1, wherein in step S03, the calcination temperature is 350° C.~450° C.

8. The preparation method of claim 1, wherein the diameter of the coated lithium-ion sieve is 45 nm~55 nm; and the thickness of the coating layer is 2 nm~4 nm.

* * * * *